US009013759B2

(12) United States Patent
Ishida

(10) Patent No.: US 9,013,759 B2
(45) Date of Patent: Apr. 21, 2015

(54) DOCUMENT READING UNIT, IMAGE FORMING APPARATUS INCORPORATING SAME, AND METHOD OF DETECTING ORIGINAL DOCUMENT USING WITH SAME

(71) Applicant: Masatoshi Ishida, Kanagawa (JP)

(72) Inventor: Masatoshi Ishida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/141,555

(22) Filed: Dec. 27, 2013

(65) Prior Publication Data
US 2014/0192386 A1 Jul. 10, 2014

(30) Foreign Application Priority Data
Jan. 8, 2013 (JP) ................................. 2013-001150

(51) Int. Cl.
| H04N 1/40 | (2006.01) |
|---|---|
| H04N 1/00 | (2006.01) |
| H04N 1/028 | (2006.01) |
| H04N 1/10 | (2006.01) |
| H04N 1/04 | (2006.01) |

(52) U.S. Cl.
CPC ....... *H04N 1/00689* (2013.01); *H04N 1/00708* (2013.01); *H04N 1/0071* (2013.01); *H04N 1/00713* (2013.01); *H04N 1/00734* (2013.01); *H04N 1/00737* (2013.01); *H04N 1/00748* (2013.01); *H04N 1/0075* (2013.01); *H04N 1/00753* (2013.01); *H04N 1/02815* (2013.01); *H04N 1/1061* (2013.01)

(58) Field of Classification Search
None
See application file for complete search history.

(56) References Cited

U.S. PATENT DOCUMENTS

| 5,973,797 | A | 10/1999 | Tanaka et al. | |
|---|---|---|---|---|
| 2004/0165223 | A1* | 8/2004 | Ishido et al. | ................ 358/449 |
| 2005/0129436 | A1 | 6/2005 | Kohchi et al. | |
| 2005/0206761 | A1 | 9/2005 | Iguchi et al. | |
| 2006/0001923 | A1 | 1/2006 | Kakutani | |
| 2009/0080031 | A1 | 3/2009 | Ishido et al. | |
| 2009/0122357 | A1 | 5/2009 | Ishido et al. | |
| 2010/0073694 | A1 | 3/2010 | Fujiwara | |
| 2010/0103479 | A1 | 4/2010 | Seo | |
| 2010/0296135 | A1* | 11/2010 | Tanaka | .......................... 358/475 |

FOREIGN PATENT DOCUMENTS

| JP | 2005-156638 | 6/2005 |
|---|---|---|
| JP | 2005-354205 | 12/2005 |
| JP | 2010226690 A | 10/2010 |

OTHER PUBLICATIONS

Extended European Search Report dated May 8, 2014.

* cited by examiner

*Primary Examiner* — Quang N Vo
(74) *Attorney, Agent, or Firm* — Harness, Dickey & Pierce, P.L.C.

(57) ABSTRACT

A document reading unit included in an image forming apparatus and operated with a method of detecting an original document, includes an original document table, a moving irradiation unit having multiple block light sources moving in a sub scanning direction while irradiating the original document, an image sensor receiving reflected light, and a controller that starts a length specifying operation with the moving irradiation unit located at a position facing the original document, sequentially turns on the block light sources, obtains an amount of reflected light under lighting conditions of each block light sources, and determines the length of the original document in the main scanning direction. While the moving irradiation unit is moving in the sub scanning direction, the image sensor receives the reflected light on a region of the original document in the sub scanning direction under each lighting condition during the length specifying operation.

13 Claims, 9 Drawing Sheets

DOCUMENT READING UNIT, IMAGE FORMING APPARATUS INCORPORATING SAME, AND METHOD OF DETECTING ORIGINAL DOCUMENT USING WITH SAME

CROSS-REFERENCE TO RELATED APPLICATIONS

This patent application is based on and claims priority pursuant to 35 U.S.C. §119 to Japanese Patent Application No. 2013-001150, filed on Jan. 8, 2013 in the Japan Patent Office, the entire disclosure of which is hereby incorporated by reference herein.

BACKGROUND

1. Technical Field

Embodiments of the present invention relate to a document reading unit, an image forming apparatus including the document reading unit, and a method of detecting an original document using with the document reading unit to cause an image sensor to read an image on an original document.

2. Related Art

As an example of a document reading unit, Japanese Patent Application Publication No. JP 2005-354205-A discloses a document reading unit that has a configuration provided with a platen cover that opens and closes with respect to a contact glass and an optical table that includes an LED array including multiple LED elements aligned in a main scanning direction of an original document along the surface of the contact glass. The optical table moves in a sub scanning direction that is a direction along the surface of the contact glass and is perpendicular to the main scanning direction so as to optically scan an image formed on the original document placed on the contact glass. Further, when the platen cover is closed with respect to the contact glass, the original document is pressed against the contact glass. In this state, when a read start instruction is issued, the document reading unit moves the optical table in the sub scanning direction while irradiating respective light beams emitted by the multiple LED elements of the optical table functioning as a moving light emitting part toward the original document and obtaining reflected light beams reflected on the original document. Consequently, the obtained reflected light beams are received by CCDs functioning as image sensors to read the image of the original document.

Prior to reading the image of the original document as described above, a controller of the document reading unit performs a length specifying operation to specify the length in the main scanning direction of the original document placed on the contact glass. To perform the length specifying operation, the document reading unit includes an open/close sensor in the vicinity of the platen cover to detect an opening/closing operation of the platen cover. When a user opens the platen cover to place the original document on the contact glass, the open/close sensor detects the opening/closing of the platen cover. When the opening of the platen cover is detected, the controller of the document reading unit causes the optical table to move from a given home position in the sub scanning direction to the document size detection position that located opposite the leading area of the original document. Thereafter, when the open/close sensor detects start of the closing operation of the platen cover, the controller of the document reading unit repeats the following operations until the length in the main scanning direction of the original document is specified. That is, the controller causes any of multiple LED elements included in the LED array to turn on, so that the CCDs receive the reflected light. Then, based on the amount of the reflected light, the controller determines whether the original document is present or not over the lighting LED elements. By sequentially changing the LED elements to be lit, the controller performs determination of presence of the original document on the contact glass. Then, based on the determination results, the controller specifies the length in the main scanning direction of the original document.

In JP 2005-354205-A, the document reading unit having the above-described configuration can decrease disturbances due to the LED light emitted by the LED array coming into user's eye(s) during the length specifying operation.

JP 2005-354205-A is believed to have disclosed the following operations to decrease disturbances. As the platen cover is being closed with the original document placed on the contact glass, the document reading unit starts the length specifying operation and lights the LED elements. Thereafter, when the platen cover is completely closed, even in the region in which no original document resides, the surface of the platen cover that presses the original document reflects the LED lights well even in the region that no original document is located. Therefore, the controller misdetects that the original document resides in the region. Due to this reason, the length specifying operation is required to start when the user starts to close the platen cover and to finish before when the platen cover is completely closed. During the period, since the platen cover is not fully closed, the LED light can easily come into the user's eye(s) from an open gap between the contact glass and the platen cover.

In the document reading unit disclosed in JP 2005-354205-A, the LED elements are turned on in a given order during the length specifying operation. By so doing, the amount of light of the LED elements can be reduced when compared with the whole LED elements are turned on simultaneously. Accordingly, the amount of light coining into the user's eye(s) at the same time from the open gap between the contact glass and the platen cover may be reduced, thereby decreasing the user's disturbances.

However, if a relatively large solid image is formed on an upstream leading area (hereinafter, simply a "leading area") in the sub scanning direction of the original document, it is likely that the document reading unit performs false detection in length of the original document in the main scanning direction thereof. Specifically, the optical table located at a document size detection position is disposed facing the leading area of the original document. Some original documents do not have margins in the leading area thereof while typical original documents mostly have. If a relatively large solid image is formed in the leading area of the original document, reflection of light is blocked by the solid image in a region in which the solid image is formed in the main scanning direction of the original document. Therefore, an amount of reflection of light on the leading area of the original document is significantly low when compared with the amount of reflection of light on the pure surface of the original document. Consequently, the region having the solid image thereon is misdetected as a region that does not reside on the original document. Accordingly, the length in the main scanning direction of the original document is likely to be misdetected.

SUMMARY

The present invention provides a document reading unit including an original document table on a surface of which an original document is placed, a moving irradiation unit having multiple block light sources aligned in a main scanning direction of a surface of the original document and to move in a sub scanning direction that is a direction along the surface of the original document table and perpendicular to the main scanning direction while irradiating light emitted by the multiple block light sources to the original document placed on the original document table and obtaining reflected light reflected on the original document, an image sensor to receive reflected light from the original document irradiated by the moving irradiation unit and read an image formed on the original document, and a controller configured to perform a length specifying operation to specify a length of the original document in the main scanning direction. The controller starts the length specifying operation in a state in which the moving irradiation unit is located at a position facing the original document placed on the original document table, sequentially turns on the multiple block light sources one by one, obtains an amount of reflected light received by the image sensor under respective lighting conditions of the multiple block light sources, and determines the length in the main scanning direction of the original document based on the obtained amount of reflected light. The controller causes the image sensor to receive the reflected light reflected on a region having a width in the sub scanning direction of the original document placed on the original document table under the multiple lighting conditions during the length specifying operation while causing the moving irradiation unit to move in the sub scanning direction.

Further, the present invention provides an image forming apparatus including the above-described document reading unit, and an image forming device to form an image on a recording medium based on an image reading result obtained by the document reading unit.

Further, the present invention provides a method of detecting an original document including placing the original document on a surface of an original document table, reading data of an image of the original document, and performing a length specifying operation to specify a length of the original document in the main scanning direction. The reading includes emitting light to the original document from a moving irradiation unit comprising multiple block light sources aligned in a main scanning direction along the surface of the original document table, obtaining reflected light reflected on the original document, moving the moving irradiation unit along the surface of the original document in a sub scanning direction that is perpendicular to the main scanning direction to an original document reading start position, and receiving the reflected light of the original document by an image sensor. The performing includes starting the length specifying operation in a state in which the moving irradiation unit is located at a position facing the original document placed on the original document table, turning on the multiple block light sources one by one, obtaining an amount of received light obtained by the image sensor under respective lighting conditions, and determining the length of the original document in the main scanning direction based on the amount of reflected light.

BRIEF DESCRIPTION OF THE DRAWINGS

A more complete appreciation of the invention and many of the advantages thereof will be obtained as the same becomes better understood by reference to the following detailed description when considered in connection with the accompanying drawings, wherein.

DETAILED DESCRIPTION

Figure 1:
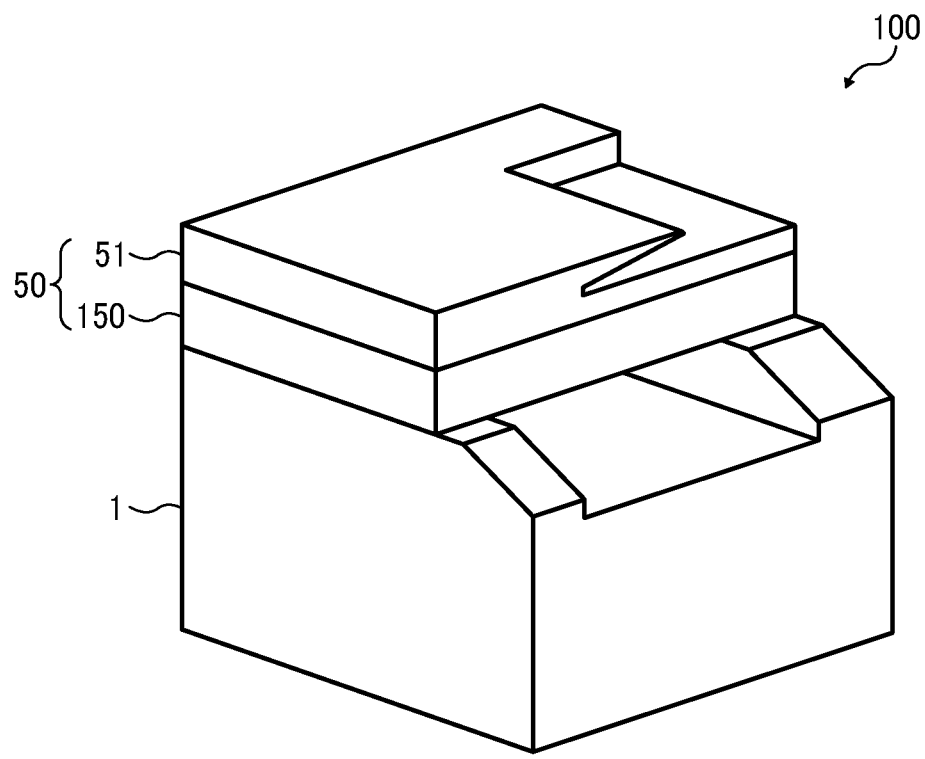
FIG. 1 is a perspective view illustrating a schematic appearance of an image forming apparatus according to an embodiment of the present invention.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present invention.

The terminology used herein is for describing particular embodiments and is not intended to be limiting of exemplary embodiments of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of the present invention. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of the present invention.

The present invention is applicable to any image forming apparatus, and is implemented in the most effective manner in an electrophotographic image forming apparatus.

In describing preferred embodiments illustrated in the drawings, specific terminology is employed for the sake of clarity. However, the disclosure of the present invention is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of the present invention are described.

Figure 2:
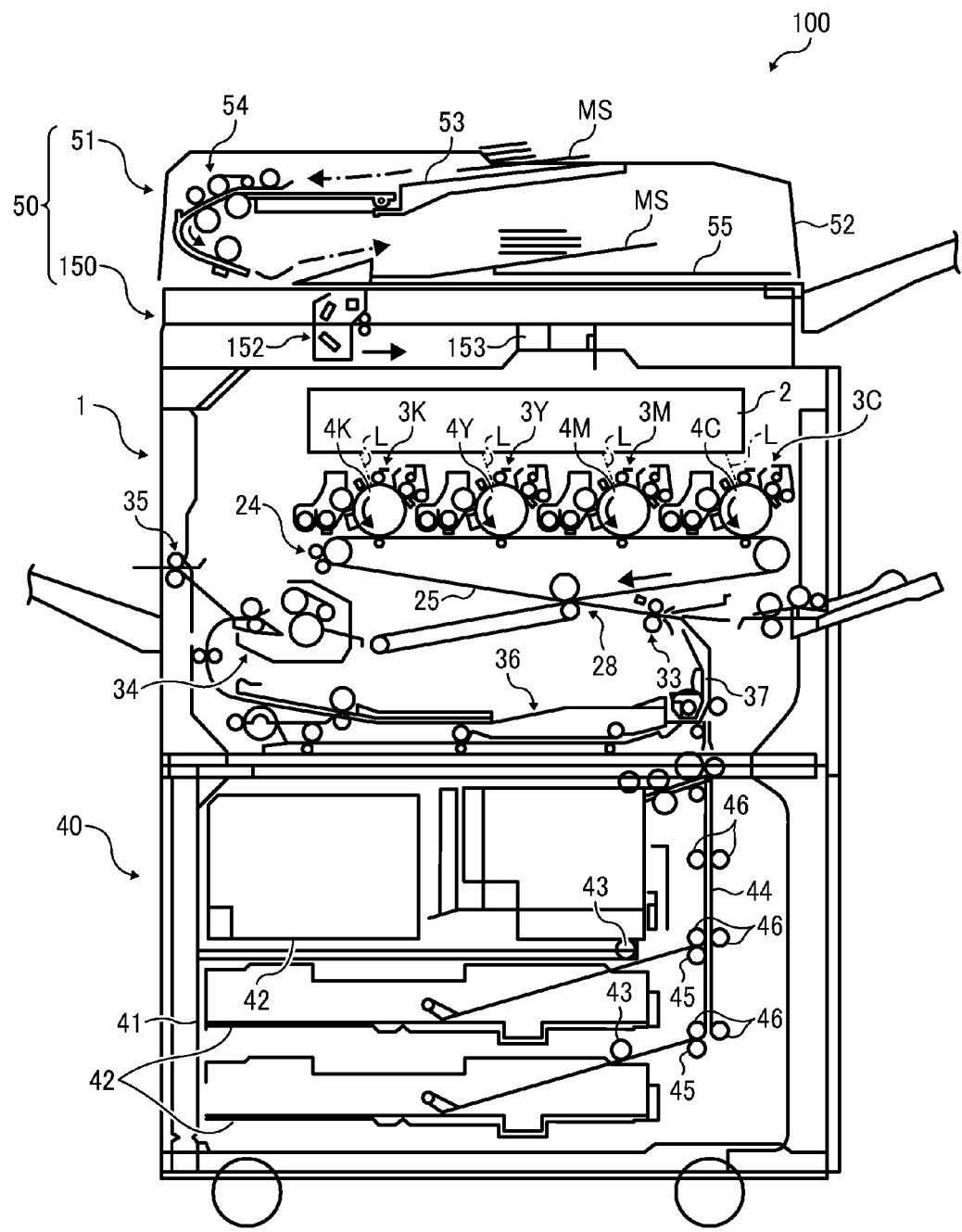
FIG. 2 is a schematic diagram illustrating a configuration of the image forming apparatus.

A description is given of a basic configuration of an entire electrophotographic image forming apparatus 100 according to an embodiment of the present invention, with reference to FIGS. 1 and 2.

The image forming apparatus 100 may be a copier, a facsimile machine, a printer, a multifunction peripheral or a multifunction printer (MFP) having at least one of copying, printing, scanning, facsimile, and plotter functions, or the like. According to the present embodiment, the image forming apparatus 100 is an electrophotographic color copier that forms color and monochrome toner images on recording media by electrophotography.

FIG. 1 shows a perspective view of the image forming apparatus 100 according to an embodiment. The image forming apparatus 100 includes an image forming part 1, a sheet feeding part 40, and an image reading part 50. The image reading part 50 includes a scanner 150 and an automatic document feeder (hereinafter referred to as ADF) 51. The scanner 150 functions as a document reading unit fixedly mounted on the image forming part 1. The ADF 51 that functions as a document transfer unit is supported by the scanner 150.

FIG. 2 shows a schematic configuration of the image forming apparatus 100 according to an embodiment.

As illustrated in FIG. 2, the sheet feeding part 40 includes a paper bank 41, two sheet containers 42 disposed vertically in the paper bank 41, sheet feed rollers 43 each provided to a corresponding sheet container 42 to feed a recording sheet functioning as a sheet member therefrom, separation rollers 45 each provided in the vicinity of a corresponding sheet container 42 to separate the fed recording sheets one by one, and multiple transfer roller pairs 46 to convey the recording sheet toward the image forming part 1.

Each sheet container 42 accommodates a stack of multiple recording sheets therein. The sheet feed roller 43 contacts to press an uppermost recording sheet in the sheet container 42. As the sheet feed roller 43 rotates, the uppermost recording sheet is fed from the sheet container 42.

In an adjacent region of each sheet container 42, a first transfer roller that is a left roller and a second transfer roller of each transfer roller pair 46 in FIG. 2 contact each other to form a transfer nip area. The separation roller 45 is disposed below the first transfer roller of the transfer roller pair 46. The separation roller 45 and the first transfer roller of the transfer roller pair 46 are in contact with each other in a vertical direction to form a separation transfer nip area.

The recording sheet fed from the sheet container 42 with the aid of rotation of the sheet feed roller 43 enters the separation transfer nip area formed between the separation roller 45 and the first transfer roller of the transfer roller pair 46. In the separation transfer nip area, while rotating counterclockwise in FIG. 2, the first transfer roller of the transfer roller pair 46 applies a transfer force to move the recording sheet from the sheet container 42 toward the sheet feeding path 44. By contrast, the separation roller 45 rotates counterclockwise to apply a transfer force to move the recording sheet from the sheet feeding path 44 to the sheet container 42 so that the recording sheet is returned to the sheet container 42.

When a single recording sheet is fed from the sheet container 42, the first transfer roller of the transfer roller pair 46 and the separation roller 45 exert respective transfer forces in opposite directions in the separation transfer nip area. This action applies a load beyond a given threshold on a drive transmission unit that drives the separation roller 45. In response to this status of the separation roller 45, a torque limiter that is provided in the drive transmission unit cuts the power transmission from a DC brushless motor to the separation roller 45. Accordingly, the separation roller 45 changes the direction of rotation to rotate with the first transfer roller of the transfer roller pair 46. As a result, the recording sheet is discharged from the separation transfer nip area toward the sheet feeding path 44.

When multiple recording sheets are fed from the sheet container 42, the first transfer roller of the transfer roller pair 46 applies a transfer force to move the uppermost recording sheet from the sheet container 42 toward the sheet feeding path 44 in the separation transfer nip area. By so doing, the uppermost recording sheet is fed from the separation transfer nip area toward the sheet feeding path 44. By contrast, the separation roller 45 applies a transfer force to move a lowermost recording sheet from the sheet feeding path 44 to the sheet container 42 so that the lowermost recording sheet is returned from the separation transfer nip area to the sheet container 42. According to this action, the uppermost recording sheet is separated from the other recording sheets in the separation transfer nip area. As a result, a single recording sheet is fed to the sheet feeding path 44.

The recording sheet fed to the sheet feeding path 44 enters a transfer nip area formed between the first transfer roller and the second roller of the transfer roller pair 46 and receives a transfer force to move from bottom to top in the vertical direction. Accordingly, the recording sheet in the sheet feeding path 44 is conveyed toward the sheet feeding path 37.

The image forming part 1 includes an optical writing unit 2, four image forming units 3K, 3Y, 3M, and 3C, a transfer unit 24, a sheet transfer unit 28, a registration roller pair 33, a fixing unit 34, a switchback unit 36, and the sheet feeding path 37. The image forming units 3K, 3Y, 3M, and 3C form black, yellow, magenta, and cyan images, respectively.

The optical writing unit 2 includes a light source such as a laser diode and an LED. By driving the light source in the optical writing unit 2, laser light beams L are emitted toward four photoconductors 4K, 4Y, 4M, and 4C to irradiate respective surfaces of the photoconductors 4K, 4Y, 4M, and 4C.

Accordingly, electrostatic latent images of respective single colors are formed on the surfaces of the photoconductors 4K, 4Y, 4M, and 4C, which will be developed to visible toner images via a given development process.

Next, a description is given of a part of the configuration of the image forming part 1 included in the image forming apparatus 100.

Figure 3:
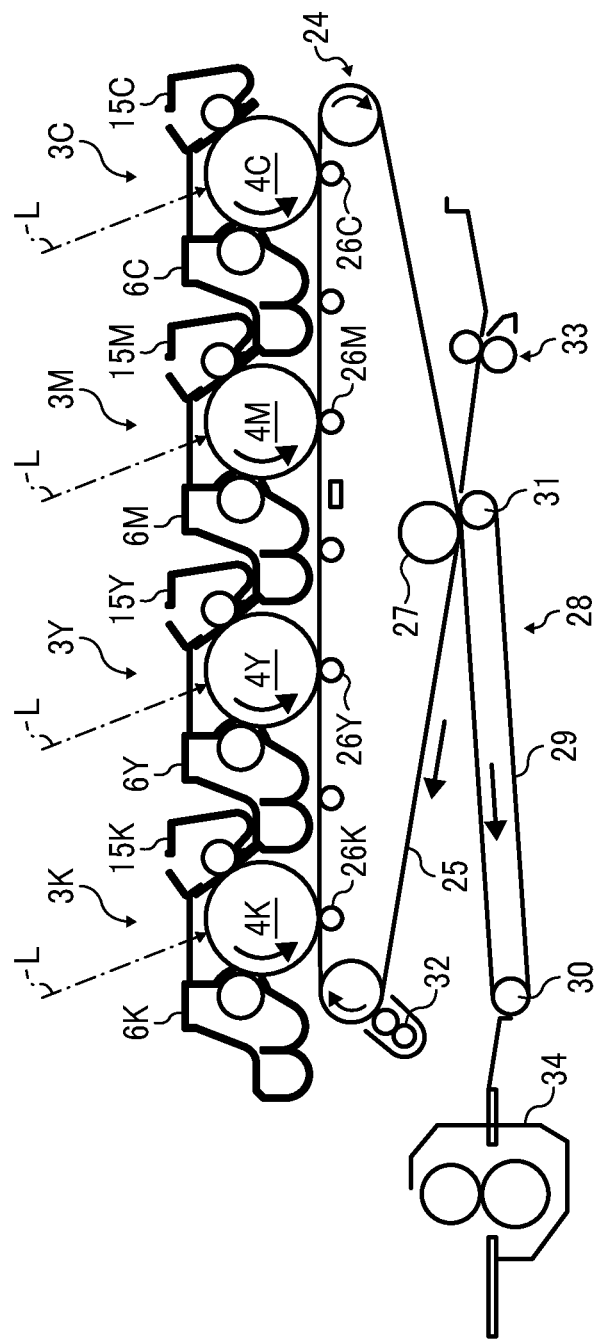
FIG. 3 is an enlarged view illustrating a part of an inner configuration of an image forming device included in the image forming apparatus.
Figure 4:
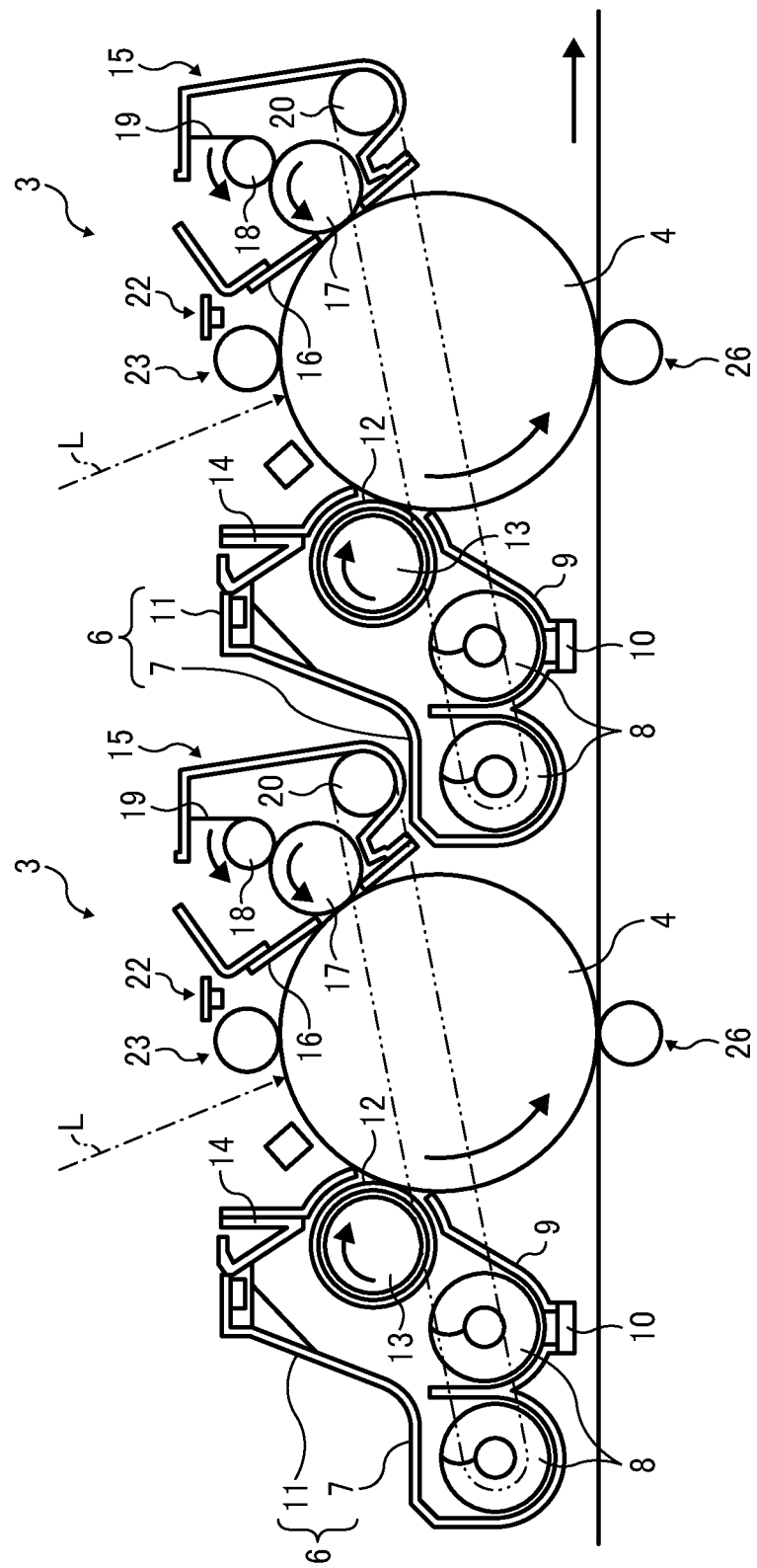
FIG. 4 is an enlarged view illustrating a tandem part of the image forming device of FIG. 3.

FIG. 3 is an enlarged view illustrating a part of an inner configuration of the image forming part 1. FIG. 4 is an enlarged view illustrating a tandem part including the image forming units 3K, 3Y, 3M, and 3C.

It is to be noted that the image forming units 3Y, 3M, 3C, and 3K employ different single color toners, which are black (K), yellow (Y), magenta (M), and cyan (C) toners. Except for the colors of toners, the image forming units 3Y, 3M, 3C, and 3K have configurations identical to each other. Accordingly, FIG. 4 does not show any suffix indicating the difference of the toner colors.

Each of the image forming units 3K, 3Y, 3M, and 3C functions as a single supporting unit in a common form to include each photoconductor 4 (which are the photoconductors 4K, 4Y, 4M, and 4C) and units and components disposed around the photoconductor 4. The image forming units 3K, 3Y, 3M, and 3C are detachably attached to a body of the image forming apparatus 100.

Hereinafter, the units and components included in the body of the image forming apparatus 100 are often referred to in a singular unit without suffix indicating toner colors. For example, the image forming units 3K, 3Y, 3M, and 3C may also be referred to as "the image forming unit 3".

The image forming unit 3 includes the photoconductor 4 and image forming units such as a charger 23, a development unit 6, a drum cleaning unit 15, and an electric discharging lamp 22 disposed around the photoconductor 4. The image forming apparatus 100 has a tandem-type configuration in which the four image forming units 3K, 3Y, 3M, and 3C are disposed facing an intermediate transfer belt 25 having an endless loop along a direction of movement of the intermediate transfer belt 25.

The photoconductor 4 has a drum-shaped body with a photoconductive layer coated with organic photoconductor material over an aluminum elementary tube or the like. Alternately, the photoconductor 4 may have an endless belt body.

The development unit 6 employs two-component developer that includes magnetic carriers and non-magnetic toner. The development unit 6 includes an agitating section 7 and a development section 11. The agitating section 7 agitates the two-component developer accommodated therein and conveys the two-component developer to a development sleeve 12. The development section 11 supplies the non-magnetic toner included in the two-component developer and held by the development sleeve 12 to the photoconductor 4.

The agitating section 7 is located at a position lower than the development section 11 and includes two transfer screws 8, a partition, a development case 9, and a toner density sensor 10. The two transfer screws 8 are disposed in parallel to each other. The partition is disposed between the transfer screws 8. The development case 9 has an opening or a slot to face the photoconductor 4. The toner density sensor 10 is disposed on the bottom of the development case 9.

The development section 11 includes a development sleeve 12, a magnet roller 13, and a doctor blade 14. The development sleeve 12 faces the photoconductor 4 through the slot of the development case 9. The magnet roller 13 is fixedly disposed inside the development sleeve 12. The doctor blade 14 is disposed adjacent to the development sleeve 12 but the leading edge thereof is not in contact with the development sleeve 12.

The development sleeve 12 has a non-magnetic, rotatable tubular body. The magnet roller 13 has multiple magnetic poles arranged in the order in a rotation direction of the development sleeve 12, starting from an opposed position to the doctor blade 14. Each of these magnetic poles applies a magnetic force at a given position in the rotation direction of the development sleeve 12, with respect to the two-component developer held on the development sleeve 12. With this action of the magnetic roller 13, the two-component developer that is conveyed from the agitating section 7 is attracted to the surface of the development sleeve 12 so as to be attached thereto and to form a magnetic brush of toner along the lines of the magnetic force on the surface of the development sleeve 12.

In accordance with rotation of the development sleeve 12, the magnetic brush is regulated to have an appropriate layer thickness when passing by the opposed position to the doctor blade 14. Then, the magnetic brush is moved to a development region facing the photoconductor 4. Due to a difference of potentials between a development bias that is applied to the development sleeve 12 and an electrostatic latent image formed on the surface of the photoconductor 4, the toner is transferred onto the electrostatic latent image so that the electrostatic latent image is developed to a visible toner image.

Further, in accordance with rotation of the development sleeve 12, the magnetic brush is returned to the development section 11. After leaving from the surface of the development sleeve 12 due to repulsion of the magnetic field formed between the magnetic poles of the magnet roller 13, the magnetic brush is returned to the agitating section 7. An appropriate amount of toner is supplied to the two-component developer in the agitating section 7 based on a result or results detected by the toner density sensor 10.

It is to be noted that, alternative to the two-component developer, the development unit 6 according to the present embodiment may employ one-component developer that does not include magnetic carriers.

The drum cleaning unit 15 includes a cleaning blade 16, a fur brush 17, an electric field roller 18, a scraper 19, and a collection screw 20.

The cleaning blade 16 is an elastic member to be pressed against the photoconductor 4, but the configuration thereof is not limited thereto.

The fur brush 17 is provided to increase cleanability. The fur brush 17 is a conductive member and is rotatable in a direction indicated by arrow in FIG. 4. An outer circumferential surface of the fur brush 17 contacts the surface of the photoconductor 4. The fur brush 17 also functions as an applier that scrapes a solid lubricant to obtain fine powder of lubricant and applies the fine powder to the surface of the photoconductor 4.

The electric field roller 18 is a metallic member that applies a bias to the fur brush 17. The electric field roller 18 is disposed rotatable in a direction indicated by arrow in FIG. 4.

The scraper 19 has a leading edge that is pressed against the electric field roller 18.

The toner attached to the fur brush 17 is transferred onto the electric field roller 18 that contacts the fur brush 17 in a counter direction to be applied with a bias while the electric field roller 18 is rotating. After being scraped and removed from the electric field roller 18 by the scraper 19, the toner falls onto the collection screw 20. The collection screw 20 conveys the collected toner toward an edge portion of the drum cleaning unit 15 in a direction perpendicular to a sheet of the drawings and transfers the collected toner to a recycle transfer unit 21. The recycle toner unit 21 sends the collected toner to the development unit 6 for recycling or reusing.

The electric discharging lamp 22 removes residual electric charge remaining on the surface of the photoconductor 4 by photo irradiation. Thereafter, the electrically discharged surface of the photoconductor 4 is uniformly charged by the charger 23 again and then optically irradiated by the optical writing unit 2.

The charger 23 is a charging roller to apply a charge bias to the surface of the photoconductor 4 while rotating and contacting the photoconductor 4. The charger 23 may be a scorotron charger that charges the photoconductor 4 without contacting the photoconductor 4.

By performing the above-described operations with the configuration illustrated in FIG. 3, black (K), yellow (Y), magenta (M), and cyan (C) images are formed on the photoconductors 4K, 4Y, 4M, and 4C of the image forming units 3K, 3Y, 3M, and 3C, respectively.

The transfer unit 24 is disposed below the image forming units 3K, 3Y, 3M, and 3C. The transfer unit 24 functions as a belt drive unit to cause the intermediate transfer belt 25 that is wound with tension by multiple rollers to move endlessly in a clockwise direction in FIG. 3 while the intermediate transfer belt 25 is contacting the photoconductors 4K, 4Y, 4M, and 4C. By so doing, respective primary transfer nip areas are formed between the photoconductors 4K, 4Y, 4M, and 4C and the intermediate transfer belt 25 that has an endless loop. Primary transfer rollers 26K, 26Y, 26M, and 26C disposed in contact with an inner loop of the intermediate transfer belt 25 press the intermediate transfer belt 25 against the photoconductors 4K, 4Y, 4M, and 4C. A power source applies the primary transfer bias to the primary transfer rollers 26K, 26Y, 26M, and 26C. With this action, respective primary electric fields are formed in the respective primary transfer nip areas for black, yellow, magenta, and cyan toner images so that the black, yellow, magenta, and cyan toner images formed on the photoconductors 4K, 4Y, 4M, and 4C, respectively, are electrostatically transferred onto the intermediate transfer belt 25.

Along with the endless movement of the intermediate transfer belt 25 in the clockwise direction in FIG. 3, the intermediate transfer belt 25 passes through the primary transfer nip areas for the black, yellow, magenta, and cyan toner images sequentially. At the primary transfer nip areas, the toner images are sequentially transferred and overlaid onto the front surface of the intermediate transfer belt 25 for primary transfer. Due to the primary transfer of the toner images, a four-color composite toner image (hereinafter referred to as a four-color toner image) is formed on the front surface of the intermediate transfer belt 25.

The sheet transfer unit 28 is disposed below the transfer unit 24. The sheet transfer unit 28 includes a sheet transfer belt 29, a drive roller 30, and a secondary transfer roller 31. The sheet transfer belt 29 is an endless belt that is wound around the drive roller 30 and the secondary transfer roller 31. The intermediate transfer belt 25 and the sheet transfer belt 29 are sandwiched between the secondary transfer roller 31 and the lower tension roller 27 of the transfer unit 24. With this configuration, a secondary transfer nip area in which the front surface of the intermediate transfer belt 25 and the front surface of the sheet transfer belt 29 are in contact with each other is formed. The secondary transfer roller 31 is applied with a secondary transfer bias by a power source. By contrast, the lower tension roller 27 of the transfer unit 24 is grounded. As a result, a secondary transfer electric field is formed in the secondary transfer nip area.

The registration roller pair 33 is disposed on a right side of the second transfer nip area in FIG. 3. A registration roller sensor is disposed adjacent to an entrance of the registration nip area of the registration roller pair 33. The recording sheet functioning as a sheet member is conveyed from the sheet feeding part 40 toward the registration roller pair 33. After a given time has elapsed since detection of the leading edge of the recording sheet by the registration roller sensor, the recording sheet is stopped and the leading edge thereof abuts against the registration nip area of the registration roller pair 33.

After the leading edge of the recording sheet contacts the registration nip area of the registration roller pair 33, the registration roller pair 33 resumes the rotation to synchronize movement of the recording sheet with movement of the four-color toner image formed on the intermediate transfer belt 25, so that the recording sheet is conveyed to the secondary transfer nip area.

In the secondary transfer nip area, the four-color toner image formed on the intermediate transfer belt 25 contacts the recording sheet. Due to action of the secondary transfer electric field and a nip pressure in the secondary transfer nip area, the four-color toner image is secondarily transferred onto the recording sheet. By being mixed with a white color of a surface of the recording sheet, the four-color toner image is developed to a full-color toner image. After passing through the secondary transfer nip area, the recording sheet having the full-color toner image on the surface thereof is stripped or separated from the intermediate transfer belt 25. Then, while being held on the front surface of the sheet transfer belt 29, the recording sheet is conveyed to the fixing unit 34 along with endless rotation of the sheet transfer belt 29.

After the secondary transfer of the toner image from the intermediate transfer belt 25 onto the recording sheet in the secondary transfer nip area, residual toner remains on the surface of the intermediate transfer belt 25. The residual toner is scraped and removed from the surface of the intermediate transfer belt 25 by the belt cleaning unit 32 that is disposed in contact with the outer surface of the intermediate transfer belt 25.

The fixing unit 34 fixes the full-color toner image to the recording sheet by application of heat and pressure therein. Then, the recording sheet having the fixed toner image thereon is conveyed from the fixing unit 34 to a sheet discharging roller pair 35 to be discharged out of the body of the image forming apparatus 100.

In FIG. 2, the switchback unit 36 is disposed below the sheet transfer unit 28 and the fixing unit 34. After a full-color toner image is fixed to one side or a front surface of the recording sheet, a switching claw is moved to change a direction of conveyance of the recording sheet to a sheet switching device. The recording sheet is reversed to enter the secondary transfer nip area again. There, a toner image is secondarily transferred onto the other side or a back surface of the recording sheet, then is fixed to the recording sheet, and is discharged to a sheet discharging tray.

The scanner 150 that is fixed onto the image forming part 1 includes a moving light unit 152 that functions as a moving irradiation unit. The moving light unit 152 is disposed immediately below a second contact glass 155 that is fixed to an upper wall of a casing of the scanner 150 so as to contact an original document MS. The moving light unit 152 includes multiple LED arrays 152a functioning as block light sources and optical image forming units such as reflection mirrors. The moving light unit 152 moves in a sub scanning direction that is a left and right direction in FIG. 1. As the moving light unit 152 moves from the left side to the right side in FIG. 1, light emitted from each LED array 152a is reflected by the original document MS placed on the second contact glass 155. Thereafter, the reflected light travels via the reflection mirrors to be received by image sensors 153 fixed to a body of the scanner 150. The image sensors 153 are also referred to as charge coupled devices (CCDs) 153.

It is to be noted that the moving light unit 152 can move its position slightly to the left side from the position illustrated in FIG. 2 so as to be disposed immediately below a first contact glass 154 that is fixed to the upper wall of the casing of the scanner 150.

The ADF 51 that is disposed on the scanner 150 includes a body cover 52, a document loading tray 53, a document transfer unit 54, and a document stacker 55.

The body cover 52 holds and supports the document loading tray 53 on which the original document MS is loaded to be read. The document transfer unit 54 conveys the original document MS that functions as a sheet member. After being read, the original document MS is stacked in the document stacker 55.

Figure 5:
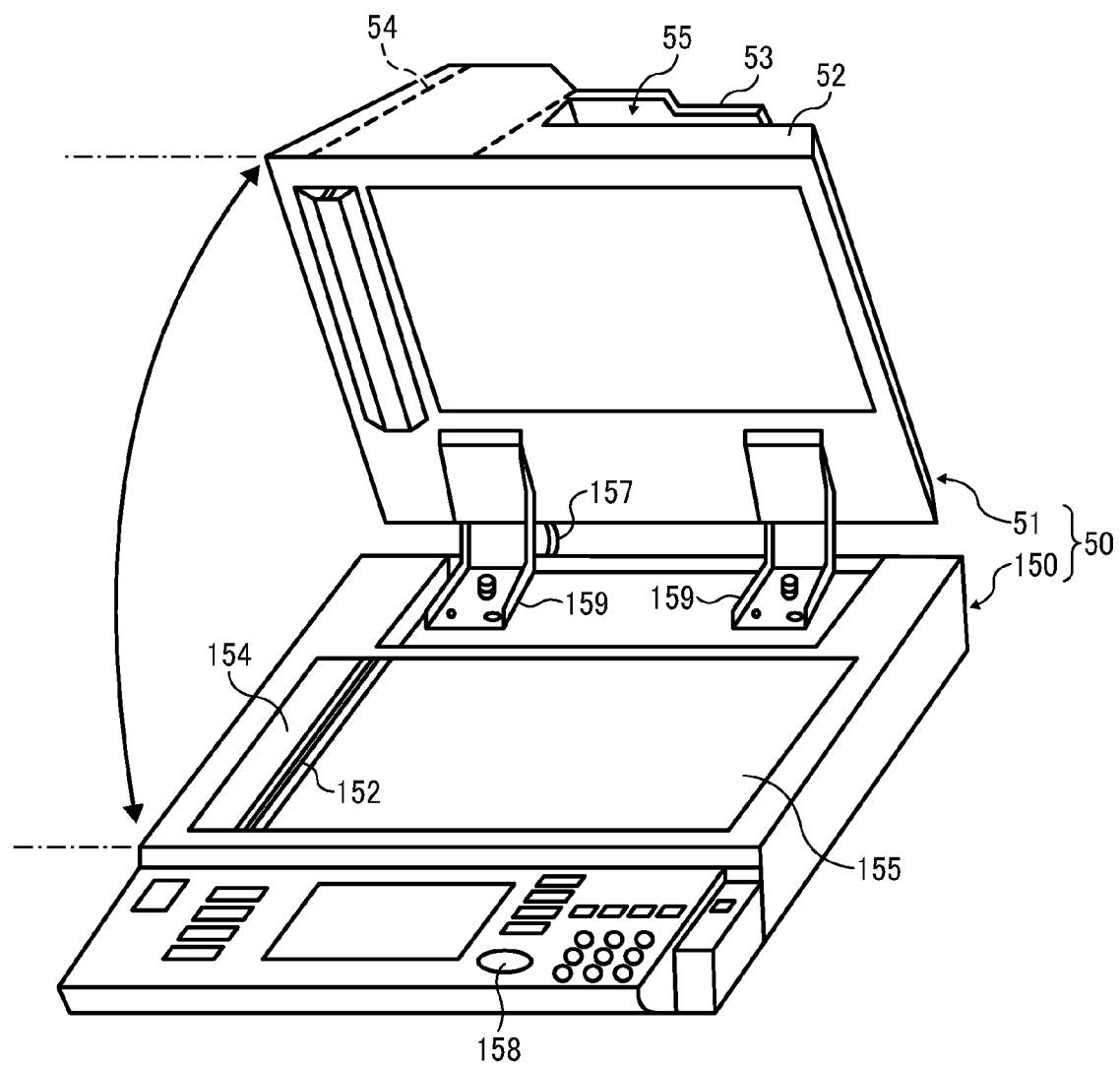
FIG. 5 is a perspective view illustrating an image reading device included in the image forming apparatus unit.

As illustrated in FIG. 5, hinges 159 are fixed to the scanner 150 to connect the ADF 51 and the scanner 150. With the hinges 159 attached to the scanner 150, the body cover 52 opens or closes with respect to the scanner 150 in a vertical direction. When the body cover 52 is open, the first contact glass 154 and the second contact glass 155 disposed on the upper surface of the scanner 150 are exposed.

When copying a page or pages of a book or a stack of original documents MS on one side of which is bound, the pages cannot be separated, and therefore cannot fed by the ADF 51. To copy images on a book or original documents, the ADF 51 is opened as illustrated in FIG. 5, the page to be copied is placed on the second contact glass 155 with the face down, and the ADF 51 is closed. Then, a copy start button 158 is pressed.

The moving light unit 152 of the scanner 150 stays at a home position that is a position immediately below the first contact glass 154 in a standby state. When the copy start button 158 is pressed, the moving light unit 152 starts to move from the home position to a position that is located immediately below the second contact glass 155. Then, the moving light unit 152 keeps moving from a left edge to a right edge of the second contact glass 155 shown in FIG. 5. At this time, the moving light unit 152 causes light emitted from the LED array to reflect on the original document MS to guide the reflected light to the CCDs 153. By so doing, the image on the original document MS is read sequentially by the CCDs 153 from the leading edge of the original document (on an upstream side in the sub scanning direction) to the trailing edge of the original document MS.

It is to be noted that the ADF 51 also functions as an original document pressing unit to press the original document MS on the second contact glass 155 that functions as an original document table.

When copying a page or pages of a stack of original documents MS that are not bound and simply accumulated on each other, the ADF 51 separates and feeds the original documents MS one by one automatically, so that images on the separate original documents MS are sequentially read by the scanner 150. In this case, an operator or a user first sets the stack of original documents MS on the document loading tray 53, and then presses the copy start button 158.

When the copy button 158 is pressed, the ADF 51 separates and feeds the stack of original documents MS placed on the document loading tray 53 sequentially to the document transfer unit 54. Then, while reversing the separated original documents MS, the ADF 51 feeds the reversed original document MS to the document stacker 55. In this conveyance process, the original document MS is reversed and conveyed immediately above the first contact glass 154 of the scanner 150.

With the above-described actions, the image formed on a first side of the original document MS is scanned by the moving light unit 152 staying at the home position and is read by the CCD.

As illustrated in FIG. 5, the image reading part 50 that includes the ADF 51 and the scanner 150 further includes an open/close sensor 157. The open/close sensor 157 may be a rotary encoder to detect an open/close angle or an angle of opening or closing the ADF 51. Hereinafter, the open/close angle of the ADF 51 is 0 degree when the ADF 51 contacts the second contact glass 155 of the scanner 150 to cover the whole second contact glass 155. In addition, the open/close angle of the ADF 51 is 90 degree when the ADF 51 is open to extend in a substantially vertical direction.

Figure 6:
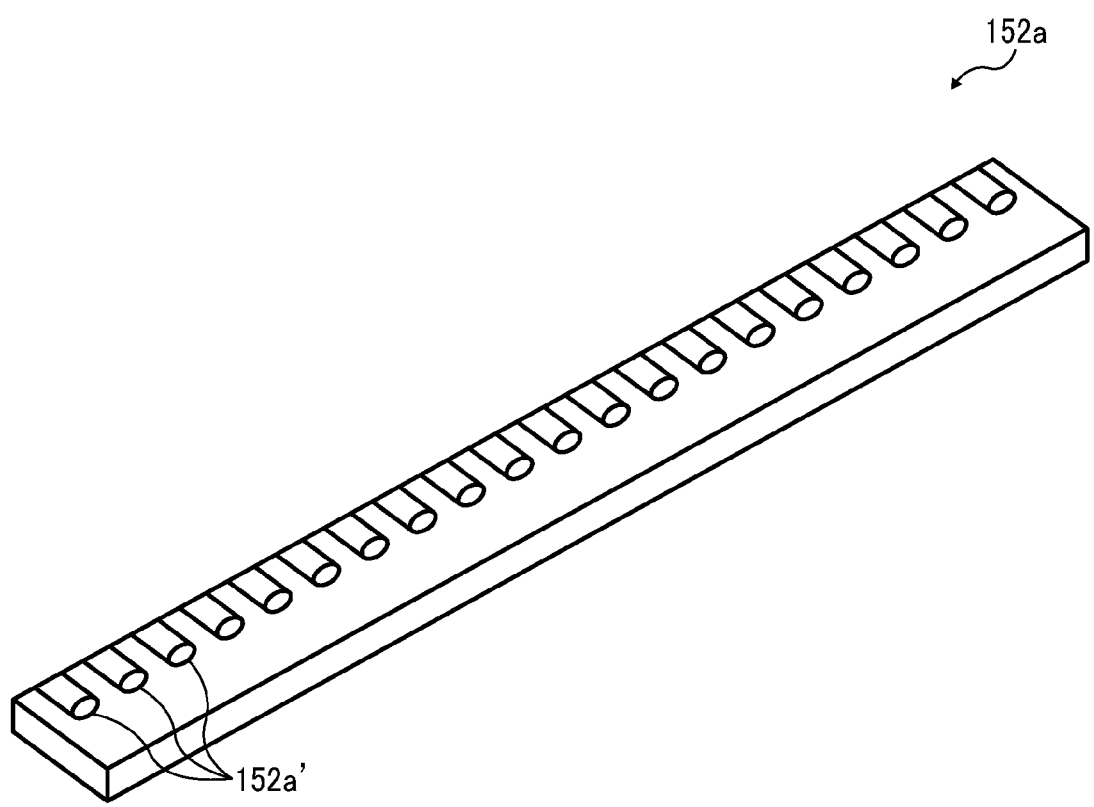
FIG. 6 is a perspective view illustrating an LED array mounted on a moving light unit of the image reading unit.

FIG. 6 is a perspective view illustrating one of the LED arrays 152a provided on the moving light unit 152.

Each of the LED arrays 152a functions as a block light source and includes multiple LED elements 152a' as illustrated in FIG. 6. The multiple LED elements 152a' are aligned along the surface of the first contact glass 15 in a main scanning direction that is a direction perpendicular to a moving direction of the moving light unit 152. When the scanner 150 reads the image on the original document MS, the moving light unit 152 is moved from the leading edge thereof to the trailing edge thereof with all of the LED elements 152a' on each LED array 152a turned on.

Figure 7:
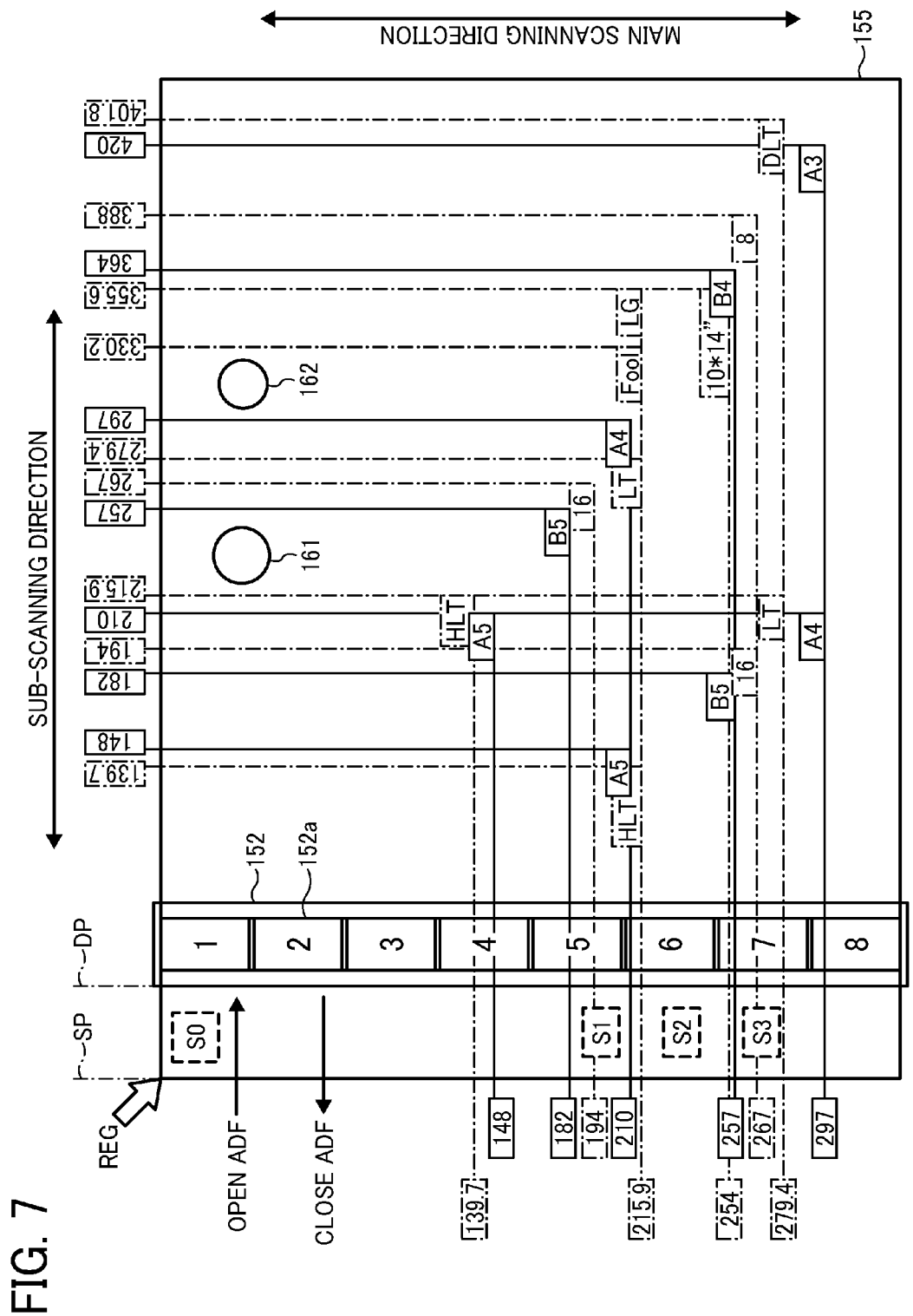
FIG. 7 is a plan view illustrating positions of various documents placed on a second contact glass of a scanner, respective document sizes, and lighting patterns of the LED array.

FIG. 7 is a plane diagram illustrating positions according to original documents placed on the second contact glass 155, respective document sizes, and lighting patterns of each LED array 152a. FIG. 7 shows the second contact glass 155, viewed from top thereof. The moving light unit 152, a first sub scanning size sensor 161, and a second sub scanning size sensor 162 are disposed immediately below the second contact glass 155.

In FIG. 7, texts shown in each box with solid lines, which are A5, HLT, B5, second Chinese size, LT, A4, Foolscap, 10×14", LG, first Chinese size, DLT, and A3, indicate corresponding sizes of original documents. Values shown in each box with dotted lines or solid lines indicate corresponding dimensions of original documents in its longitudinal direction or its lateral direction. Texts shown in each box with dotted lines, which are S0, S1, S2, and S3, indicate corresponding light intensity amount determining region in the main scanning direction during detection of each size.

The lateral direction of the flat surface of the second contact glass 155 corresponds to the main scanning direction in document scanning for reading document image, and the longitudinal direction thereof extends along the sub scanning direction in document scanning for reading document image. The longitudinal direction of the moving light unit 152 extends along the main scanning direction. A moving mechanism causes the moving light unit 152 to move in the sub scanning direction. Specifically, the moving light unit 152 can move reciprocally in the longitudinal direction of the second contact glass 155. When reading a document image placed on the second contact glass 155, the moving light unit 152 moves from the left to the right in the sub scanning direction in FIG. 7.

Hereinafter, the left side in the sub scanning direction of FIG. 7 in reading the original document MS is referred to as a reading upstream side and the right side is referred to as a reading downstream side.

The image forming apparatus 100 according to the present embodiment has a document standard position as indicated in FIG. 7 by a white arrow illustrated at the upper left corner that is one of four corners on the two-dimensional plane of the second contact glass 155. The upper left corner is an upstream end in the sub scanning direction when reading the document image on the second contact glass 155.

Figure 8:
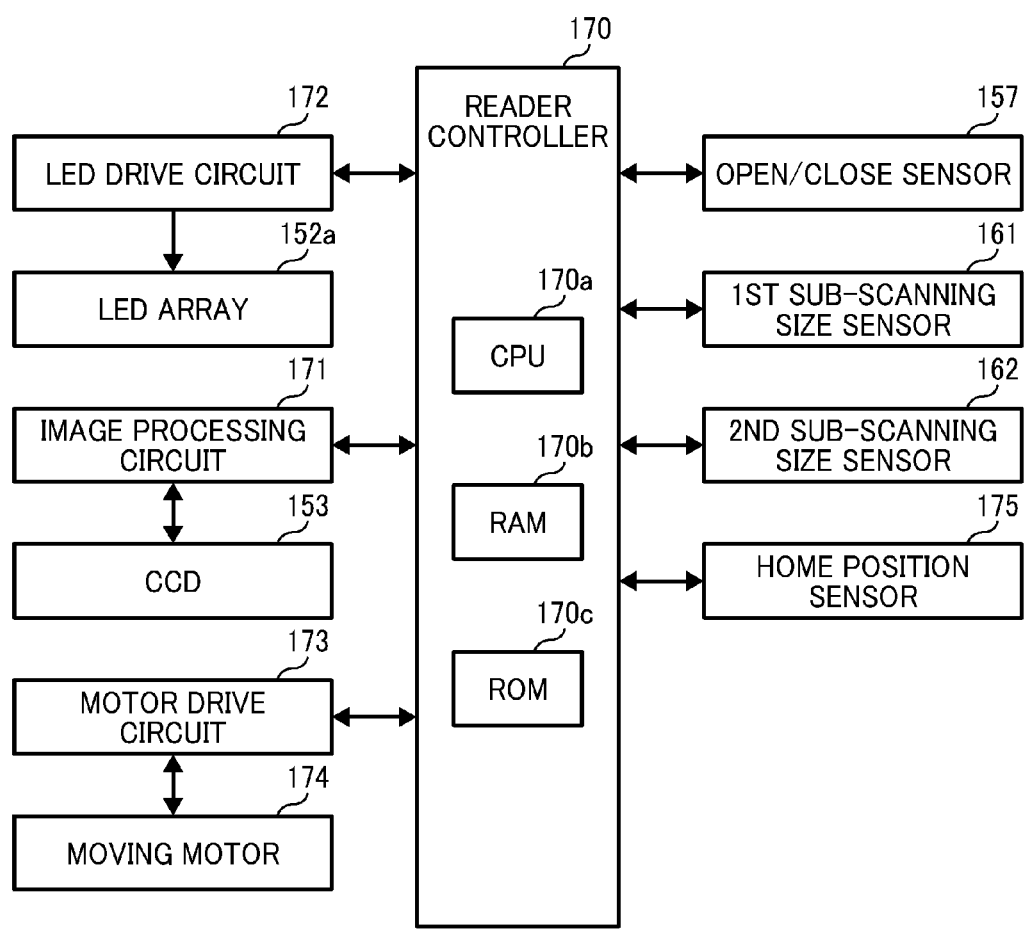
FIG. 8 is a block diagram illustrating a part of an electric circuitry of the scanner.

FIG. 8 is a block diagram illustrating a part of electric circuitry of the scanner 150 provided to the image forming apparatus 100 according to the present embodiment.

In FIG. 8, a reading controller 170 functions as a controller and includes a central processing unit (CPU) 170a, a random access memory (RAM) 170b, and a read-only memory (ROM) 170c. The reading controller 170 is connected to an open/close sensor 157, the first sub scanning size sensor 161, the second sub scanning size sensor 162, an image processing circuit 171, an LED drive circuit 172, a motor drive circuit 173, and a home position sensor 175. The functions of the open/close sensor 157, the LED array 152a, and the CCDs 153 are previously described.

The home position sensor 175 includes a transmission photosensor to detect whether or not the moving light unit 152 is located at the home position. The home position sensor 175 then outputs the detection results to the reading controller 170.

Further, the LED drive circuit 172 controls turn on/off of a switch of each LED array 152a having multiple LED elements by block based on signals issued from the reading controller 170.

The image processing circuit 171 constructs image data of a read image based on signals issued by the CCDs 153. The image processing circuit 171 outputs a signal of light intensity amount in a given region in the main scanning direction of the CCDs 153 to the reading controller 170 when requested.

The moving motor 174 is used to move the moving light unit 152 in the sub scanning direction. In the present embodiment, the moving motor 174 employs a stepping motor. While excitation to the moving motor 174 is controlled by the motor drive circuit 173, a driving amount and a driving direction of the moving motor 174 are controlled by the reading controller 170.

When standing by for reading, the moving light unit 152 is located at the home position. In FIG. 7, the home position is not depicted because the home position is located to the left from the second contact glass 155 in FIG. 7.

Generally, the ADF 51 is closed completely to cover the second contact glass 155. Therefore, an operator opens the ADF 51 to place the original document MS on the second contact glass 155. The operator moves the ADF 51 from 0 degree of an angle of opening thereof. When the angle of opening of the ADF 51 reaches 30 degrees thereof, the reading controller 170 provided to the scanner 150 recognizes that the ADF 51 is opening. Based on the recognition, the reading controller 170 causes the moving light unit 152 from the home position to a document size detection position DP as illustrated in FIG. 7.

It is to be noted that the upstream end in document image reading in the sub scanning direction of the moving light unit 152 is described as a positional reference in the sub scanning direction of the moving light unit 152. Therefore, a dot-dashed line that indicates the document size detection position DP is located at the same position of the upstream end in document image reading by the moving light unit 152 in FIG. 7.

The LED arrays 152a of the moving light unit 152 are eight (8) blocks aligned in the main scanning direction. Turn on/off of the multiple LED elements 152a' can be controlled by block. That is, all of the LED elements 152a' in the same block are turned on or off at the same time.

The first sub scanning size sensor 161 and the second sub scanning size sensor 162 are reflective photosensors to emit light to the second contact glass 155 from respective positions immediately under the second contact glass 155. Immediately after the ADF 51 is opened, the light emitted from a light emitting element of the first sub scanning size sensor 161 moves upright in the vertical direction through the second contact glass 155. Therefore, the first sub scanning size sensor 161 does not detect the light emitted from the light emitting element thereof as reflected light. By contrast, when the original document MS is placed on a region right above the first sub scanning size sensor 161 on the whole plane of the second contact glass 155, the light emitted from the light emitting element of the first sub scanning size sensor 161 reflects on the surface of the original document MS to be reflected light. The reflected light is received by a light receiving element of the first sub scanning size sensor 161.

As described above, when the original document MS is placed on the second contact glass 155 immediately above the first sub scanning size sensor 161, the first sub scanning size sensor 161 receives a light amount that exceeds a given threshold amount by the light receiving element thereof. In other words, the first sub scanning size sensor 161 detects the original document MS.

By contrast, when the original document MS is not placed on the second contact glass 155, the light amount received by the light receiving element of the first sub scanning size sensor 161 is less than the given threshold amount. In other words, the first sub scanning size sensor 161 does not detect the original document MS.

The second sub scanning size sensor 162 performs similarly to the above-described operations of the first sub scanning size sensor 161. Specifically, the second sub scanning size sensor 162 performs detection depending on whether or not the original document MS is placed on the second contact glass 155 immediately above the second sub scanning size sensor 162.

An operator places the original document MS of any size on the second contact glass 155 in a state in which the corner at the leading edge of the original document MS in the sub scanning direction is located at the document standard position of the second contact glass 155 as illustrated in FIG. 7. At this time, according to combination of the document size and the document orientation, the original document MS falls on any of the following three states.

In a first state of the original document MS, the downstream edge of the original document MS in document reading in the sub scanning direction is located at respective positions immediately above the first sub scanning size sensor 161 and the second sub scanning size sensor 162. In this state, both the first sub scanning size sensor 161 and the second sub scanning size sensor 162 detect the original document MS.

In a second state original document MS, the downstream edge of the original document MS in document reading in the sub scanning direction is located at the position immediately above the first sub scanning size sensor 161 and is not located at the position immediately above the second sub scanning size sensor 162. In this state, the first sub scanning size sensor 161 detects the original document MS while the second sub scanning size sensor 162 does not.

In a third state of the original document MS, the downstream edge of the original document MS in document reading in the sub scanning direction is located off the respective positions immediately above the first sub scanning size sensor 161 and the second sub scanning size sensor 162. In this state, neither the first sub scanning size sensor 161 nor the second sub scanning size sensor 162 detect the original document MS.

When the original document MS is placed on the second contact glass 155, the moving light unit 152 located at the document size detection position DP faces the upstream edge of the original document MS in document reading in the sub scanning direction. That is, the document size detection position DP is located opposite the upstream edge of the original document MS in document reading with respect to the moving light unit 152.

After the original document MS is placed on the second contact glass 155, the ADF 51 is closed. As the ADF 51 is moving to be closed, the open/close angle of the ADF 51 is decreasing from 90 degrees. Eventually, when the open/close angle of the ADF 51 detected by the open/close sensor 157 reaches 70 degrees, the reading controller 170 determines that the ADF 51 has started closing. Based on the determination, the reading controller 170 starts a size detecting operation.

In the size detecting operation, the reading controller 170 determines whether the first sub scanning size sensor 161 and the second sub scanning size sensor 162 are in the first, second, or third state. The result of this determination is hereinafter referred to as a "state determination result".

The reading controller 170 also starts a length specifying operation to specify the length of the original document MS in the main scanning direction by block lighting of the LED arrays 152a. In the length specifying operation, the LED elements provided to a first LED array 152a of the whole LED arrays 152a are lit. The first LED array 152a emits light to a reference deciding region S0 in the main scanning direction. Then, of the light receiving amount in the whole main scanning detected by the CCDs 153, the reading controller 170 determines whether or not the original document MS is placed in the reference deciding region S0 based on the light receiving amount in the reference deciding region S0.

In the main scanning direction, the reference deciding region S0 is located in the vicinity of the document standard position. Therefore, when the operator places the original document MS on the second contact glass 155 at the document standard position, it can be interpreted that the original document MS is placed on the reference deciding region S0.

In the length specifying operation, the reading controller 170 firstly determines whether or not the original document MS is placed on the reference deciding region S0 to check and determine whether or not the original document MS is placed on the second contact glass 155.

When the light amount received by the CCDs 153 in the reference deciding region S0 does not exceed the given threshold amount, the reading controller 170 determines that the original document MS is not placed on the second contact glass 155. Then, the reading controller 170 causes an error message, which is "No document is placed on the contact glass. Otherwise, the position of the document on the contact glass is improper", to be displayed on an operation display of the image forming part 1. After the LED elements of the 1st block are turned off, the reading controller 170 forcedly terminates the length specifying operation and the size detecting operation.

By contrast, when the light amount received by the CCDs 153 in the reference deciding region S0 exceeds the given threshold amount, the reading controller 170 determines that the original document MS is placed on the second contact glass 155 and continues the length specifying operation.

The reading controller 170 that has continued the length specifying operation turns off the LED elements of the first LED array 152a. After turning off the LED elements of the first LED array 152a, the reading controller 170 turns on the LED elements of a fifth LED array 152a. The fifth LED array 152a corresponds to the first deciding region S1 in the main scanning direction. Then, based on the light receiving amount in the first deciding region S1 detected by the CCDs 153, the reading controller 170 determines whether or not the length of the original document MS in the main scanning direction is 194 mm or smaller.

Specifically, when the light amount received by the CCDs 153 in the first deciding region S1 exceeds the given threshold amount, the reading controller 170 determines that the original document MS is placed immediately above the first deciding region S1 in the main scanning direction. With this determination, the reading controller 170 determines that the length of the original document MS in the main scanning direction is not 194 mm or smaller and continues the length specifying operation.

By contrast, when the light amount received by the CCDs 153 in the first deciding region S1 does not exceed the given threshold amount, the reading controller 170 specifies that the length of the original document MS in the main scanning direction is 194 mm or smaller. Then, the reading controller 170 turns off the LED elements of the fifth LED array 152a, and forcedly terminates the length specifying operation. After specifying the size of the original document MS based on combination of the result of specifying the length of the original document MS in the main scanning direction and the result of the state determination result, the reading controller 170 completes the size detecting operation.

When the length of the original document MS in the main scanning operation is greater than 194 mm, the reading controller 170 turns off the LED elements of the fifth LED array 152a and then turns on the LED elements of a sixth LED array 152a. The sixth LED array 152a corresponds to the second deciding region S2 in the main scanning direction. Then, based on the light receiving amount in the second deciding region S2 detected by the CCDs 153, the reading controller 170 determines whether or not the length of the original document MS in the main scanning direction is less than 240 mm.

When the length of the original document MS in the main scanning direction is less than 240 mm, the reading controller 170 specifies that the length of the original document MS in the main scanning direction is less than 240 mm. After specifying the size of the original document MS in the main scanning direction, the reading controller 170 turns off the LED elements of the sixth LED array 152a and completes the length specifying operation. Then, the reading controller 170 specifies the size of the original document MS based on combination of the result of specifying the length of the original document MS in the main scanning direction and the result of the state determination result, and completes the size detecting operation.

When the length of the original document MS in the main scanning operation is 240 mm or greater, the reading controller 170 turns off the LED elements of the sixth LED array 152a and then turns on the LED elements of a seventh LED array 152a. The seventh LED array 152a corresponds to the third deciding region S3 in the main scanning direction. Then, based on the light receiving amount in the third deciding region S3 detected by the CCDs 153, the reading controller 170 determines whether or not the length of the original document MS in the main scanning direction is 267 mm or smaller. After specifying the size of the original document MS in the main scanning direction, the reading controller 170 turns off the LED elements of the seventh LED array 152a and completes the length specifying operation. Then, the reading controller 170 specifies the size of the original document MS based on combination of the result of specifying the length of the original document MS in the main scanning direction and the result of the state determination result, and completes the size detecting operation.

In the image forming apparatus 100 according to the present embodiment, the LED elements of the LED array 152a partially lights in the length specifying operation to specify the length of the original document MS in the main scanning direction. This operation can prevent or reduce disturbance caused by light emitted by the LED array 152a coming into the user's eyes when performing the length specifying operation.

In performing a known length specifying operation, the leading edge area of the original document MS that faces the moving light unit 152 located at the document size detection position DP is supposed to have a white margin. However, some original documents do not have the white margin at the leading edge thereof. Assuming that a solid image that is an image having a low reflectivity is formed at the leading edge of the original document MS and in the first deciding region S1 in the main scanning direction and the LED elements 152a' of the fifth LED array 152a is disposed facing the solid image formed in the leading edge area of the original document MS. This solid image obstructs light that is emitted by the LED elements of the fifth LED array 152a to be reflected on the surface of the original document MS. Therefore, the light receiving amount in the first deciding region S1 detected by the CCDs 153 significantly decreases compared to the original document that does not have any solid image in the leading edge area of the original document MS. As a result, the light receiving amount normally exceeds the given threshold amount of the original document MS and therefore the length of the original document MS in the main scanning direction is not 194 mm or smaller. However, the light receiving amount is determined not exceed the given threshold amount of light, and therefore it is likely that the reading controller 170 determines by mistake that the length of the original document MS in the main scanning direction is 194 mm or smaller.

Next, a description is given of a detailed configuration of the image forming apparatus 100 according to the present embodiment.

In FIG. 7, an upstream end in document image reading in the sub scanning direction of the second contact glass 155 corresponds to a document reading start position SP of the moving light unit 152. Reading of the original document MS is started in a state in which the upstream end in document image reading in the sub scanning direction of the moving light unit 152 is located at the document reading start position SP.

In the length specifying operation, the reading controller 170 turns on/off of the switch of the LED elements and obtains the light receiving amount while causing the moving light unit 152 to move in the sub scanning direction toward the document reading start position SP. More specifically, the original document MS is read after the size detecting operation. Reading the original document MS starts after moving the moving light unit 152 from the document size detection position DP to the home position. This operation has been performed in a comparative document reading unit having a known technique. The comparative document reading unit causes the moving light unit 152 located on the document size detection position DP to move the home position after the length specifying operation. By contrast, the scanner 150 of the image forming apparatus 100 according to the present embodiment causes the moving light unit 152 located on the document size detection position DP to move the home position at the start of the length specifying operation. As a result, with this difference, the LED elements of the LED array 152a is turned on/off and the light receiving amount is obtained in the length specifying operation while the moving light unit 152 is being moved to the document reading start position SP.

Assuming that the solid image is formed at the leading edge of the original document MS placed on the second contact glass 155 and the solid image is not formed on the entire portion of the leading edge of the leading area of the original documents but on a local region in the leading edge area of the original document MS in the sub scanning direction. In addition, the LED elements 152a' of the fifth LED array 152a of the moving light unit 152 located at the document size detection position before the size detecting operation is disposed facing the solid image formed on the leading edge area of the original document MS. The reading controller 170 that has started the length specifying operation in the above-described state causes the moving light unit 152 to move to the document reading start position SP in the sub scanning direction. Consequently, the LED elements of the fifth LED array 152a of the moving light unit 152 go off the position facing the solid image and come to face a pure surface in the leading edge area of the original document MS. The timing that the LED elements of the fifth LED array 152a come to face the pure surface of the original document MS depends on the length of the solid image in the sub scanning direction. However, a lighting timing to turn on the LED elements of the fifth LED array 152a may come the after this timing. In this case, since a great amount of reflected light can be obtained from the pure surface in the leading edge area of the original document MS, detection error in length of the original document in the main scanning direction thereof can be prevented.

Even though the LED elements of the fifth LED array 152a is moving and coming to face the solid image when the LED elements of the fifth LED array 152a reaches the lighting timing, the LED elements of the fifth LED array 152a with the lights turned on may move to a position at which the LED elements of the fifth LED array 152a does not face the solid image. In this case, a greater amount of reflected light can be obtained when compared with a condition that the LED elements of the fifth LED array 152a remains to face the solid image throughout the lighting of the LED elements of the fifth LED array 152a, the original document MS can be detected correctly. When the original document MS is detected correctly, detection error in length of the original document MS in the main scanning direction thereof can be avoided.

Accordingly, in the image forming apparatus 100 according to the present embodiment, by performing the length specifying operation while moving the moving light unit 152 to the document reading start position S along the sub scanning direction, detection error in length of the original document MS in the main scanning direction thereof.

Next, a detailed description is given of the configuration of the image forming apparatus 100 according to the present embodiment.

As described above, the size detecting operation may need to be finished between a timing that the operator starts to close the ADF 51 and a timing before the ADF 51 is completely closed. Since there are individual differences of operators in speed of closing the ADF 51, the size detecting operation is scheduled to finish within a given time period. That is, duration of performing the size detecting operation is limited to the given time period. Within the limited time period, after the moving light unit 152 located at the document size detection position DP starts to move toward the document reading start position SP in the length specifying operation, the respective local LED elements of the first, fifth, sixth, and seventh LED arrays 152a may need to be turned on sequentially in this order. In this process, if the LED elements of the first LED array 152a refrain from turning on until the speed of movement of the moving light unit 152 stabilizes, it is not likely that local lighting of the whole LED elements of the first, fifth, sixth, and seventh LED arrays 152a complete within the given time period, that is, before the ADF 51 completely closes.

To address the above-described inconvenience, after the moving light unit 152 has started its movement in the length specifying operation, the reading controller 170 of the image forming apparatus 100 according to the present embodiment is configured to start the LED elements of the first LED array 152a and obtain a light receiving amount received by the CCDs 153 in the reference deciding region S0 without waiting for the speed of movement of the moving light unit 152 increasing and reaching the given speed of movement. With this configuration, consumption of time due to the waiting until the speed of movement of the moving light unit 152 increases to the given speed of movement can be eliminated. Accordingly, a greater number of length determining operations of the original document MS based on the local lighting of the LED elements and the light receiving amount received by the CCDs 153 can be performed. As a result, the size detecting operation can be performed for a wider variety of sizes of original documents.

Figure 9:
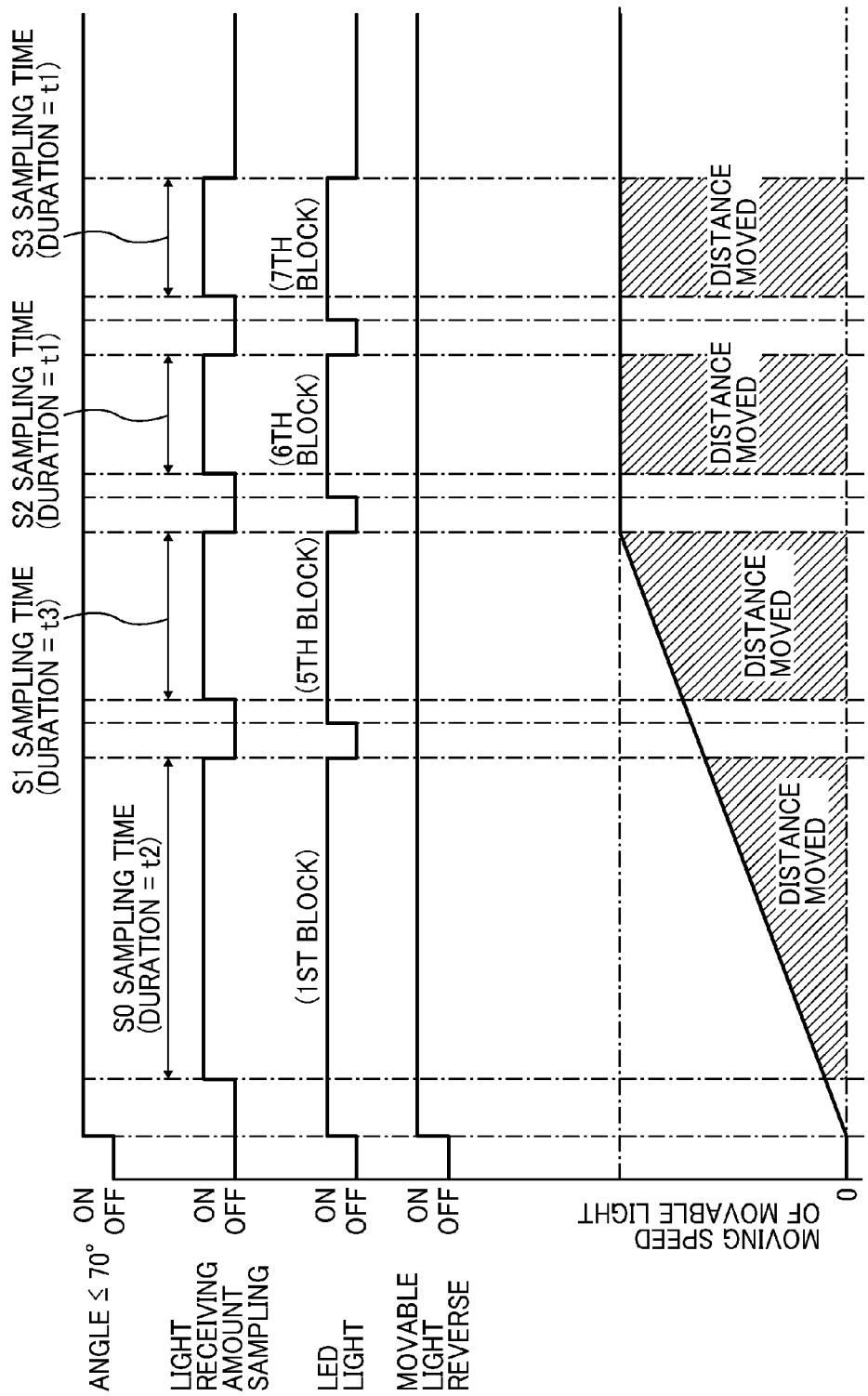
FIG. 9 is a timing chart illustrating various operation timings performed in a length specifying operation performed in the image forming apparatus.

FIG. 9 is a timing chart illustrating various operation timing performed in the length specifying operation.

In the length specifying operation, combination of local lighting of the LED elements and sampling of the light receiving amount is performed for four (4) times at the maximum, as described above. This number of performance differs depending on the size and orientation of the original document MS placed on the second contact glass 155. The timing chart of FIG. 9 shows the results of four performances of combination of the lighting and sampling.

In the first performance (hereinafter, a first sampling), the light receiving amount received in the reference deciding region S0 by the CCDs 153 is sampled under a lighting condition that the LED elements of the first LED array 152a are lit.

In the second performance (hereinafter, a second sampling), the light receiving amount in the first deciding region S1 by the CCDs 153 is sampled under a lighting condition that the LED elements of the fifth LED array 152a are lit.

In the third performance (hereinafter, a third sampling), the light receiving amount in the second deciding region S2 by the CCDs 153 is sampled under a lighting condition that the LED elements of the sixth LED array 152a are lit.

In the fourth performance (hereinafter, a fourth sampling), the light receiving amount in the third deciding region S3 by the CCDs 153 is sampled under a lighting condition that the LED elements of the fourth LED array 152a are lit.

As illustrated in the timing chart of FIG. 9, when performing the first sampling and the second sampling, the speed of movement of the moving light unit 152 that moves in reverse toward the original document reading start position has not reached the given speed. By contrast, when performing the third sampling and the fourth sampling, the speed of movement of the moving light unit 152 moving in the reverse direction is stabilized at the given speed of movement. To detect presence of the original document MS on the second contact glass 155 precisely, it is preferable that LED light is lit onto a region exceeding the given area of the original document to sample the light receiving amount of light received by the CCDs 153. In the third sampling and the fourth sampling, the light receiving amount is sampled by a first time period t1, respectively. While the moving light unit 152 is moving in reverse at the given speed, the light receiving amount is sampled for the first time period t1. By so doing, the moving light unit 152 is moved by a given reference distance within the first time period t1 to light the region corresponding to the given area of the original document MS, so that the light receiving amount is sampled.

However, in the first sampling and the second sampling, the speed of movement of the moving light unit 152 has not reached the given speed. Therefore, if the first sampling and the second sampling are set to perform for first time period t1, which equals to the performance time period for the third sampling and the fourth sampling, the moving light unit 152 cannot travel by the given reference distance and the obtained light receiving amount can be for a region smaller than the given area of the original document MS. Consequently, the presence of the original document MS cannot be detected with a preferable precise.

To address the above-described inconvenience, the image forming apparatus 100 according to the present embodiment in FIG. 9 performs sampling of the light receiving amount of the CCDs 153 in the first sampling with the LED elements of the fifth LED array 152a turned on for the second time period t2 that is greater than the first time period t1. The second time period t2 is set to a time period that may need to move the moving light unit 152 by the given reference distance. Therefore, even in the first sampling, the presence of the original document MS can be detected with a given accuracy by obtaining the light receiving amount while lighting the region in the given area of the original document MS.

In the length specifying operation, the first sampling and the second sampling are performed during a period that the moving light unit 152 is accelerating from a speed that is less than the given speed. In this period, the sampling time is gradually reduced as indicated by an expression of inequality, the second time period t2>the third time period t3. The reason of the above-described action is that, as the time elapses, a time period that is required to move the moving light unit 152 by a standard distance gradually decreases. Due to this reason, the second sampling is performed for the third time period t3 that is smaller than the second time period t2. Accordingly, the light receiving amount is sampled while light is emitted from the LED elements of each LED array 152 is irradiated onto the region corresponding to the given area of the original document MS. With this action, the presence of the original document MS is detected with a desirable accuracy. Further, by gradually reducing the sampling time period of the light receiving amount, the presence of the original document MS can be detected without extending the sampling time period excessively.

It is to be noted that, in the length specifying operation, the reading controller 170 performs an operation in which a light intensity of the LED elements of each LED array 152a is adjusted to be smaller than a light intensity thereof when reading the original document MS. By so doing, disturbance caused by light emitted by the LED elements of the LED array 152a coining into the user's eyes when performing the length specifying operation can be reduced.

The above-described embodiment and modification are examples. The present invention can achieve the following aspects effectively.

[Aspect A]

An document reading unit (for example, the scanner 150) includes an original document table (for example, the second contact glass 155), an original document pressing unit (for example, the ADF 51), an open/close detector (for example, the open/close sensor 157), a moving irradiation unit (for example, the moving light unit 152), an image sensor (for example, the CCD 153), and a controller (for example, the reading controller 170). The original document table loads an original document (for example, the original document MS) on the surface thereof. The original document pressing unit presses the original document placed on the original document table against the surface of the original document table. The open/close detector detects the opening and closing operation of the original document pressing unit with respect to the original document table. The moving irradiation unit includes multiple block light sources (for example, the LED arrays 152*a*) aligned in a main scanning direction along the surface of the original document table. While irradiating light emitted by the block light sources to the original document placed on the original document table and obtaining the light reflected on the original document, the moving irradiation unit moves along the surface of the original document table in a sub scanning direction that is perpendicular to the main scanning direction. The image sensor receives the reflected light from the original document irradiated by the moving irradiation unit and reads an image formed on the original document. The controller performs a length specifying operation to specify a length of the original document in the main scanning direction in a state in which the moving irradiation unit is located at a position facing the original document placed on the original document table. The controller sequentially turns on the multiple block light sources one by one based on detection of a closing operation of the original document pressing unit in a state in which the moving irradiation unit is moved to a document size detection position in the sub scanning direction and determines the length based on an amount of received light obtained by the image sensor under respective lighting conditions. In the document reading unit, while causing the moving irradiation unit to move in the sub scanning direction under the respective lighting conditions in the length specifying operation, the controller causes the image sensor to receive the reflected light reflected in a region corresponding to a width in the sub scanning direction of the original document placed on the original document table.

[Aspect B]

According to Aspect A, in the length specifying operation, the controller of the document reading unit turns on the a first block light source (the first block LED array 152*a*) among the multiple block light sources to obtain the amount of received light thereof after starting to move the moving irradiation unit and during a speed transition time period in which a moving speed of the moving irradiation unit increases to a given speed. With this configuration, as described above, expenditure of time caused by waiting until the moving speed of the moving irradiation unit reaches the given time is eliminated, thereby performing the size detecting operation that can be applied to a more variety of sizes of original documents.

[Aspect C]

According to Aspect B, in the length specifying operation, the controller of the document reading unit causes the moving irradiation unit to emit the light and the image sensor to receive the light for a first time period (for example, the first time period t1) to obtain data of the received amount of reflected light under the lighting condition in which a block light source that is different from the first block light source is turned on while the moving irradiation unit is moving at the given speed, and causes the moving irradiation unit to emit the light and the image sensor to receive the light for a second time period (for example, the second time period t2) that is longer than the first time period to obtain data of the amount of received light under the lighting condition in which the first block light source is turned on for the speed transition time period. With this configuration, as described above, even in the time period in which the moving speed of the moving irradiation unit is increasing, the amount of received light is sampled by emitting the light from the block light source in the region corresponding to a given area of the original document, thereby detecting the presence of the original document on the original document table with a desired accuracy.

[Aspect D]

According to Aspect C, in the length specification, the controller is configured to perform the length specifying operation in which the light is received by the image sensor under the multiple lighting conditions during the time period and gradually reduce the time period of receiving light by the image sensor under the multiple lighting conditions. With this configuration, as described above, by gradually reducing the sampling time of the amount of received light, the presence of the original document on the original document table can be detected with a desired accuracy without extending the sampling time.

[Aspect E]

According to any of Aspects A through D, the controller is configured to perform the length specifying operation in which a light intensity of the multiple block light sources in the length specifying operation is smaller than a light intensity of the multiple block light sources in an image reading operation to read the image of the original document. With this configuration, during the length specifying operation, disturbance caused by light emitted by the multiple block light sources coming into the user's eyes can be further reduced.

The above-described embodiments are illustrative and do not limit the present invention. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

What is claimed is:

1. A document reading unit comprising:
   an original document table on a surface of which an original document is placed;
   a moving irradiation unit having multiple block light sources aligned in a main scanning direction of a surface of the original document and to move in a sub scanning direction that is a direction along the surface of the original document table and perpendicular to the main scanning direction while irradiating light emitted by the multiple block light sources to the original document placed on the original document table and obtaining reflected light reflected on the original document;
   an image sensor to receive reflected light from the original document irradiated by the moving irradiation unit and read an image formed on the original document; and
   a controller configured to perform a length specifying operation to specify a length of the original document in the main scanning direction,
   wherein the controller starts the length specifying operation in a state in which the moving irradiation unit is located at a position facing the original document placed on the original document table, sequentially turns on the multiple block light sources one by one, obtains an amount of reflected light received by the image sensor under respective lighting conditions of the multiple block light sources, and determines the length in the main scanning direction of the original document based on the obtained amount of reflected light, wherein the controller causes the image sensor to receive the reflected light reflected on a region having a width in the sub scanning direction of the original document placed on the original document table under the multiple lighting conditions during the length specifying operation while causing the moving irradiation unit to move in the sub scanning direction.

2. The document reading unit according to claim 1, wherein, in the length specifying operation, the controller turns on a first block light source of the multiple block light sources to obtain the amount of reflected light by the image sensor in a unit moving time period in which a speed of movement of the moving irradiation unit is increasing to a given speed after the start of movement of the moving irradiation unit.

3. The document reading unit according to claim 2, wherein, in the length specifying operation, the controller causes the moving irradiation unit to emit the light and the image sensor to receive the reflected light for a first time period to obtain data of the received amount of reflected light under a lighting condition in which a second block light source that is different from the first block light source is turned on while the moving irradiation unit is moving at the given speed, wherein, in the length specifying operation, the controller causes the moving irradiation unit to emit the light and the image sensor to receive the reflected light for a second time period that is greater than the first time period to obtain data of the received amount of reflected light under a lighting condition in which the first block light source is turned on during the unit moving time period.

4. The document reading unit according to claim 3, wherein, in the length specifying operation, the controller receives the light by the image sensor under the respective multiple lighting conditions in the unit moving time period and causes the time of receiving the light by the image sensor under the multiple lighting conditions to be gradually reduced.

5. The document reading unit according to claim 1, wherein the controller causes each emission intensity of the multiple block light sources in the length specifying operation to be lower than each emission intensity of the multiple block light sources in an image reading operation to read the image of the original document.

6. The document reading unit according to claim 1, further comprising:

an original document pressing unit to press the original document placed on the original document table against the surface of the original document table; and an open/close detecting unit to detect an open/close operation of the original document pressing unit with respect to the original document table, wherein the controller starts the length specifying operation based on a result that the open/close detecting unit detects the close operation of the original document pressing unit.

7. An image forming apparatus comprising:
the document reading unit according to claim 1; and
an image forming unit to form an image on a recording medium based on an image reading result obtained by the document reading unit.

8. A method of detecting an original document comprising:
placing the original document on a surface of an original document table;
reading data of an image of the original document,
the reading comprising:
emitting light to the original document from a moving irradiation unit comprising multiple block light sources aligned in a main scanning direction along the surface of the original document table;
obtaining reflected light reflected on the original document;
moving the moving irradiation unit along the surface of the original document in a sub scanning direction that is perpendicular to the main scanning direction to an original document reading start position; and
receiving the reflected light of the original document by an image sensor; and
performing a length specifying operation to specify a length of the original document in the main scanning direction,
the performing comprising:
starting the length specifying operation in a state in which the moving irradiation unit is located at a position facing the original document placed on the original document table;
turning on the multiple block light sources one by one;
obtaining an amount of received light obtained by the image sensor under respective lighting conditions; and
determining the length of the original document in the main scanning direction based on the amount of reflected light.

9. The method of detecting the original document according to claim 8, wherein the performing the length specifying operation further comprises:
turning on a first block light source of the multiple block light sources; and
obtaining the amount of reflected light in a unit moving time period in which a speed of movement of the moving irradiation unit is increasing to a given speed after the start of movement of the moving irradiation unit.

10. The method of detecting the original document according to claim 9, wherein the performing the length specifying operation further comprises:
causing the moving irradiation unit to emit the light and the image sensor to receive the reflected light for the first time period to obtain data of the received amount of reflected light under a lighting condition in which a second block light source that is different from the first block light source is turned on while the moving irradiation unit is moving at the given speed; and
causing the moving irradiation unit to emit the light and the image sensor to receive the reflected light for a second time period that is greater than the first time period to obtain data of the received amount of reflected light under a lighting condition in which the first block light source is turned on during the unit moving time period.

11. The method of detecting the original document according to claim 10, wherein the performing further comprises:
receiving the light by the image sensor under the respective multiple lighting conditions in the unit moving time period; and causing the time of receiving the light by the image sensor under the multiple lighting conditions to be gradually reduced.

12. The method of detecting the original document according to claim 8, wherein the performing further comprises causing each emission intensity of the multiple block light sources in the length specifying operation to be lower than each emission intensity of the multiple block light sources in an image reading operation to read the image of the original document.

13. The method of detecting the original document according to claim 8, further comprising:
pressing the original document placed on the original document table against the surface of the original document table;
detecting an open/close operation of the original document pressing unit with respect to the original document table; and
starting the length specifying operation based on a result that the close operation of the original document pressing unit is detected.

\* \* \* \* \*